(12) United States Patent
Platts

(10) Patent No.: US 6,484,459 B1
(45) Date of Patent: Nov. 26, 2002

(54) COUNTER-PRESSURE METHOD AND APPARATUS FOR PROTECTING ROOFS AGAINST HURRICANES

(76) Inventor: Robert E. Platts, 12 Bedford Crescent, Ottawa, Ontario (CA), K1K 0E4

( * ) Notice: Subject to any disclaimer, the term of this patent is extended or adjusted under 35 U.S.C. 154(b) by 0 days.

(21) Appl. No.: 09/625,974

(22) Filed: Jul. 26, 2000

(51) Int. Cl.[7] .............................................. E04G 15/00
(52) U.S. Cl. ......................... 52/219; 52/573.1; 52/202; 52/302.1
(58) Field of Search ................................ 52/302.1, 202, 52/203, 509, 573.1, 198, 218, 219; 49/404, 475.1, 371, 51, 67, 50, 49, 63, 61

(56) References Cited

U.S. PATENT DOCUMENTS

| | | | |
|---|---|---|---|
| 3,537,378 A | * 11/1970 | Daly | 52/1 |
| 4,294,038 A | * 10/1981 | Davidson | 49/63 |
| 4,418,685 A | * 12/1983 | Frazier | 126/428 |
| 4,909,135 A | * 3/1990 | Greko | 98/42.23 |
| 5,052,286 A | * 10/1991 | Tubbesing et al. | 98/42.21 |
| 5,374,215 A | * 12/1994 | Crider et al. | 454/136 |
| 5,383,315 A | 1/1995 | Birs | |
| 5,487,701 A | * 1/1996 | Schedegger et al. | 454/271 |
| 5,568,947 A | * 10/1996 | Paquette | 285/46 |
| 5,737,874 A | 4/1998 | Sipos et al. | |
| 5,890,327 A | 4/1999 | Merser et al. | |
| 5,921,863 A | * 7/1999 | Sells | 454/359 |
| 6,119,408 A | * 9/2000 | Page | 52/2.23 |
| 6,330,768 B1 | * 12/2001 | Rodrigues | 52/202 |

* cited by examiner

Primary Examiner—Carl D. Friedman
Assistant Examiner—Jennifer I. Thissell
(74) Attorney, Agent, or Firm—Wayne H. Yan; Ogilvy Renault

(57) ABSTRACT

Counter pressure methods and apparatus for protecting roofs are described, which ensure that indoor air pressure remains negative, that is lower than ambient outdoor pressure during severe windstorms, thus counteracting and thereby reducing the uplift force on the roof surface of a building. In accordance with different embodiments of the invention, one-way valves are provided in openings in the building envelope, such as window openings, or installed over the vents into the roof space so that indoor air flows freely out of the building to a lee zone through the one-way valves while the high air pressure on the windward sides can cause little inward flow because the one-way valves quickly blow closed under wind pressure. According to a further embodiment a Venturi-tube is mounted vertically through or alongside the roof so that its open top forms its own low pressure suction area to draw air from either or both the indoors or the roof space to the same effect. The one-way valves are made from storm shutters or flaps incorporated into storm shutters, which are simple to fabricate. The invention advantageously provides a simple, low cost but efficient solution to make roofs more resistant to hurricanes.

11 Claims, 5 Drawing Sheets

COUNTER-PRESSURE METHOD AND APPARATUS FOR PROTECTING ROOFS AGAINST HURRICANES

THE FIELD OF THE INVENTION

The present invention relates to a method and an apparatus for protecting buildings against windstorms, moire particularly to a counter-pressure method and apparatus for counteracting uplift pressures of hurricane-force winds.

THE BACKGROUND OF THE INVENTION

The vast number of buildings now built in highly exposed regions and the apparently increasing frequency of category 4 and 5 hurricanes all portend more widespread destruction of houses and other buildings. Much of the destruction is needless. The loss of roofs in particular, with collateral damage to life and property can be preventable.

Many houses and other small buildings in the Caribbean and Central American "Hurricane Belt" can lose their roofs to category 3 and 4 storms; much of such stock in the U.S. part of that Belt might be little better built. Several regions now require resistance to category 5 storms for new construction, and indeed it need not be unduly costly to incorporate such resistance during construction.

Engineers have established the efficacy of solidly shuttering windows and other weak openings in reducing wind uplift forces on roofs, and the limited but significant effect is quantified in today's building codes (in stating worst-case uplift values for fully enclosed as against normally windowed small buildings). At least in the U.S.A., covering house windows with nailed on plywood sheets appears to be the favoured preparation in the face of an approaching hurricane, primarily to prevent glass breakage and wind and rain entry, but also to help thereby in keeping the roof from flying off. Such hurricane shutters are also described in more than a dozen U.S. patents, for example in U.S. Pat. No. 5,383,315 which is entitled HURRICANE SHUTTER REINFORCEMENT AND METHOD, issued to Birs on Jan. 24, 1995, and in U.S. Pat. No. 5,737,874 which is entitled SHUTTER CONSTRUCTION AND METHOD OF ASSEMBLY, issued to Sipos et al on Apr. 14, 1998.

Such storm-shuttering measures may be less commonly applied where most needed, such as on more modest houses, for elderly households or others lacking means and skills, and in much of the Caribbean or Central American parts of the Hurricane Belt where there are widespread inadequacies of the existing houses and small buildings. Plywood and its modern competitor OSB (Oriented Stand Board) are as close to ideal shuttering materials as any, but are still costly when used for the single job of protecting the glazing against missiles, to prevent breakage. In some cases the roof constructions are readily amenable to retro-reinforcing but often they are not. Both new construction and existing buildings are begging for lower cost means of "adding strength just where needed".

Therefore, there is a need for providing a more efficient and less expensive method and apparatus for protecting buildings, particularly existing buildings, against hurricane force winds.

SUMMARY OF THE INVENTION

It is one object of the present invention to provide a method and apparatus for protecting roof structures against windstorms.

It is another object of the present invention to provide a method and apparatus to maintain indoor air pressure lower than the average outdoor pressure around a building to reduce a net uplift force on the roof of the building.

It is a further object of the present invention to provide a windstorm shutter functioning as a one-way valve to ensure a lower indoor air pressure of a building to counter the uplift forces on the roof.

It is a still further object of the present invention to provide a relatively inexpensive method and apparatus for protecting buildings against hurricanes.

In general terms there is a counter-pressure method for roof reinforcement against windstorms which comprises steps of providing a plurality of one-way venting valves over openings in a building envelope, respectively to ensure that at least one of the one-way venting valves is located on a lee side of the building envelope regardless of wind direction, the one-way venting valves closing under wind pressure to prevent inward air flow and being free to open to permit outward air flow when on the lee side; closing openings in the building envelope not covered by the one-way venting valves during windstorms; and whereby indoor air flows freely out of the building envelope through the at least one of the one-way venting valves to a lee zone on the lee side to depressurize the inside of the building envelope to counteract an uplifting force on a roof of the building envelope induced by winds over the roof.

The at least one venting passage is preferably sized to have a venting capacity larger than the total inward air leakage when the windows and other openings of the house are closed during windstorms. It is preferred that the venting passage comprises a one-way valve permitting outward air flow while preventing inward air flow so that the venting passage is closed only when the indoor air pressure is not higher that the pressure of the immediate outdoor area bounding the passage. And it is still preferred that the one-way valve venting passage is provided in a structure of the house at each side so that the venting passage toward a leeward area outdoors is open during windstorms.

In accordance with one embodiment of the present invention a counter-pressure method for protecting roofs against windstorms comprises a step of equipping storm shutters as the one-way valves placed over open windows to permit air flowing outwardly through or around the shutters while prevent air flowing inwardly so that the shutters on lee walls of the house are open while the windward shutters are closed during windstorms to maintain the indoor air pressure close to the lowest outdoor air pressure bounding the shutters. At least one such shutter is mounted on each face of the house so that at least one is subjected to a low pressure lee regardless of wind direction. In approaching storm conditions the shutters are mounted and the windows inboard of the one-way valve shutters are left open so that the indoor pressure will equalise quickly with the lee suction conditions during windstorms. Further, the glazing itself can be subjected to little or no load since air can pass freely through the open windows. The entire shutter can be used as a one-way valve, or one-way valves can be placed in the body of each shutter panel that is over an operable window, or the one-way valves can be placed around the perimeter of the shutter panel. Flexible polymeric materials make the design of the one-way valves clearly practical at low costs, in simple flap valve forms that can be retrofitted to existing storm shutters or incorporated in fabricating new shutters.

In accordance with another embodiment of the invention a counter-pressure method for protecting a roof against windstorms comprises a step of providing a plurality of the one-way valve passages on roof vents of the house which are in air communication with a space under the roof, to permit air flow from the space under the roof through one or more of the one-way valve passages to a leeward area outdoors while the remainder of the one-way valve passages are closed to prevent air from flowing inwardly therethrough into the space under the roof during windstorms.

In accordance with a further embodiment of the invention a counter-pressure method and apparatus for protecting a roof against windstorms are provided. A Venturi-tube is adapted to be installed in or on the house, vertically penetrating through the roof or positioned close alongside the roof, in such a manner that an open top of the Venturi-tube above the roof is subjected to winds blowing thereacross regardless of wind direction, and is in air communication with space under the roof so that a Venturi-action induced by winds blowing over the roof decrease air pressure in the space under the roof by "sucking" air out of the space through the Venturi-tube.

With respect to another aspect of the invention, there is provided a storm shutter having a panel adapted to be mounted over an opening in a structure of a house; and a valving mechanism attached to the panel for permitting outward air flow from an indoor area of the house through or around the panel to outdoors while preventing inward air flow so that the shutter works as a one-way valve to decrease air pressure of the indoor area to compensate for an uplift force on a roof of the house induced by windstorms when windows and other openings of the house are securely closed and an outdoor area bounding the shutter is in a lee zone of winds. The valving mechanism may include means for pivotally attaching one side of the panel to an outer surface of the structure and a stop member adapted to be associated between the panel and the structure to make the panel pivotable between a closed position for inhibiting inward air flow and an open position limited by the stop member for outward air flow. The valving mechanism may also be implemented with a flap member attached to an outer surface of the panel for selectively closing a porthole defined in the panel, or strip flap members around a perimeter of the panel for selectively closing a gap formed between an inner surface of the panel and an outer surface of the structure surrounding the opening so that inward air flow through the porthole or the gap is inhibited while outward air flow is permitted.

The methods and apparatus according to the invention ensure that indoor air pressure remains relatively negative during windstorms, that is, lower than the average outdoor pressure around a building, thus markedly reducing the net uplift force on the building's roof. While the solid shuttering of windows and other glazed openings is itself known to help limit such uplift by limiting the amount of indoor over-pressure that winds can induce, this one-way valve-action and Venturi-action go radically further, inducing indoor "suction", relative to the ambient pressure outdoors.

Interpolating, for example from the "worst case" values given in ANSI-ASCE 7–95, the basis of leading building codes, one can infer that an un-shuttered example house may face peak uplifts across portions of its roof-ceiling of approximately 70 psf or more (in 130 mph hurricane winds), which would be reduced to about 50 psf or so with solid shuttering (a building with no openings) to prevent indoor over-pressure. The simple counter-pressure methods here presented can ensure negative indoor pressure, and negative pressure in the roof space where desirable, to keep the resultant uplift force down to perhaps 25 psf or less under the same conditions.

BRIEF DESCRIPTION OF THE DRAWINGS

Having thus generally described the nature of the invention, reference will now be made to the accompanying drawings, showing by way of illustration of a preferred embodiment thereof, in which.

DETAILED DESCRIPTION OF THE PREFERRED EMBODIMENT

For greater certainty the terms of "roof, "building" and "house" which are used through the specification and appended claims are defined as follows. "Roof" refers to the whole roof structure, normally the roof-ceiling structure, except where individual components of a roof are identical. "Building" or "house" refer generally to a small low-rise building, "house" being used more often simply because houses may well comprise the main field of need and application of the invention.

Figure 1A:
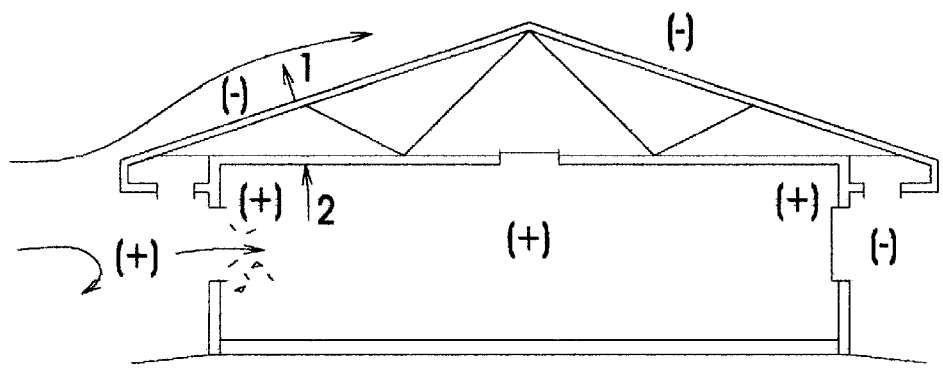
FIG. 1a is an elevational cross-sectional view of a house, schematically illustrating the normal pressure conditions in a wind storm.

FIG. 1a represents a base case of sorts: an unshuttered house in hurricane winds, windward on the left and lee on the right. ("Lee" here denotes any eddy or wind-wake zone of low pressure, not just the main leeside or leeward condition). The winds create a strong "suction" force over the roof as shown, a low or negative (−) pressure relative to ambient barometric pressure, causing uplift 1 on the whole roof structure or at least the windward half. The high positive pressure(+) shown against the windward wall, or more likely a wind-borne missile, has smashed in the window so that the whole indoor space is pressurized as indicated (+), which creates uplift 2 against the ceiling, so that the maximum uplift pressure on the roof structure becomes 1 plus 2. That resultant can be up to twice that of 1, i.e. twice the uplift that the roof would have to withstand if the windows remained intact or were tightly and strongly shuttered. Shuttering of all wall openings is taken as a given in all that follows. Fire codes in practically all jurisdictions require a hatch into each roof space, and that too is taken as a given.

Figure 1B:
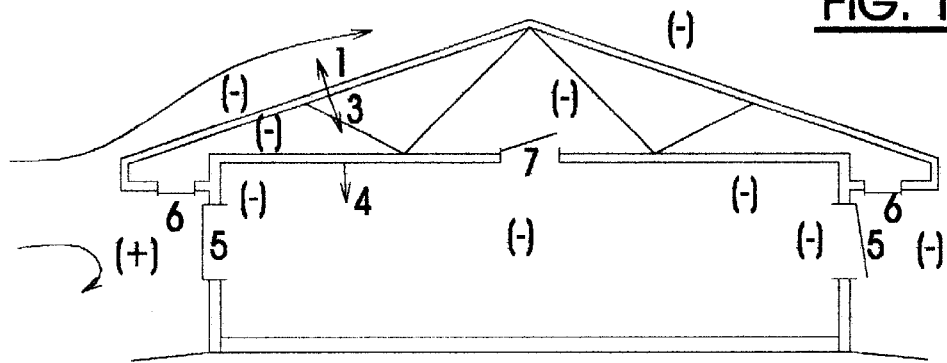
FIG. 1b through FIG. 1d are elevational cross-sectional views of a house, schematically illustrating a concept of the invention and three preferred embodiments thereof to control indoor and roof-space pressure.

FIG. 1b illustrates the same house fitted to ensure that the indoor pressure remains negative, approaching equilibrium with the leeside negative pressure condition (−). Now the roof structure faces a net uplift force of just 1 minus (3 plus 4); rather than doubled as in FIG. 1a, the uplift can be roughly halved. The method in this case is to fit some of the operable windows with one-way valves, here shown as hinged shutters 5. The aggregate size and positioning of these valves are discussed later with regard to the concerning design. If the roof frames themselves were strong and the roof sheathing well secured, the house could be left with its roof vents 6 open and its attic hatch 7 closed, in which case the one-way valves 5 would depressurize only the indoor space to help hold the roof structure down. In the schematic, however, it is assumed that the roof rafters are weak or weakly tied down or the sheathing is poorly fastened, or all of that; therefore the roof vents 6 are covered and the hatch 7 is opened or removed, so that the "suction" created by the one-way valves 5 extends to the roof space too. By countering uplift force, the one device 5 in effect increases the hold-down of the sheathing and the whole roof structure while reducing the upward bending load on the roof framing members, while also serving in the normal job of keeping the windows intact and thereby keeping rain out.

Figure 1C:
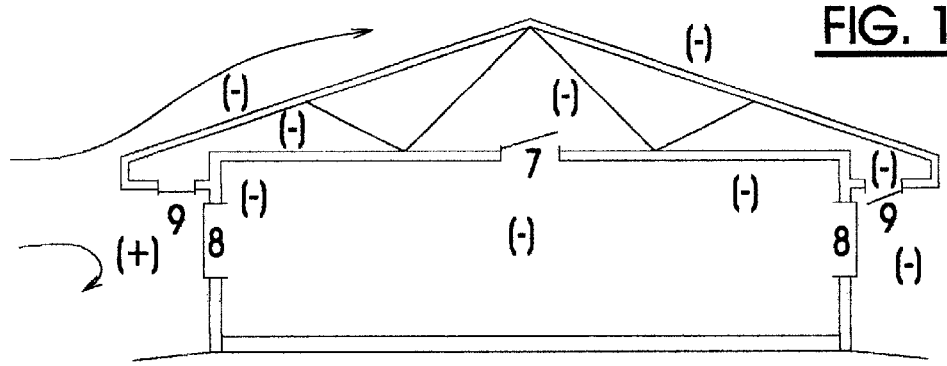

In FIG. 1c the windows are tightly shuttered 8 and the one-way valves 9 are fitted over the roof vent openings, depressurizing the roof space. Again, assuming that the whole roof structure needs to be held down, the hatch 7 is removed and the indoor space is depressurized as its pressure stays close to equilibrium with the roof space.

Figure 1D:
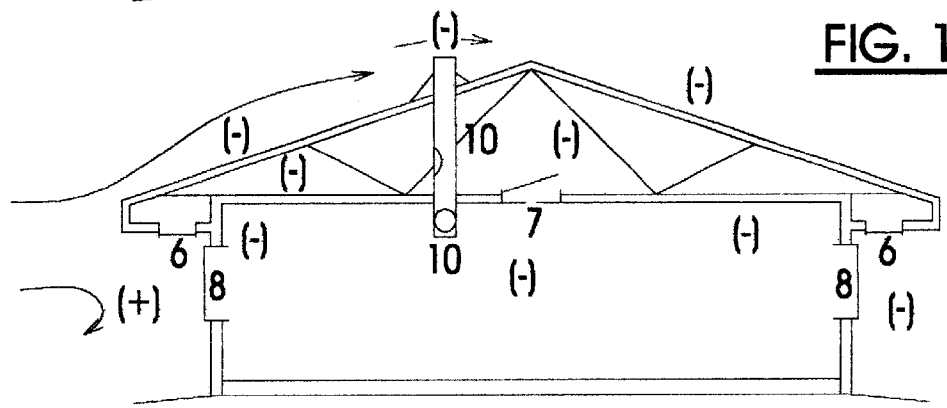

FIG. 1d illustrates the indoor space and the roof space which are depressurized through a Venturi-tube 10 of ample dimensions. The pressure at the open upper end can be much lower than the lee pressures that are relied upon in the foregoing arrangements. Here, the wall openings 8 and the roof vents 6 must be closed if both indoor space and roof space are to be depressurized. The Venturi itself can draw from both spaces as desired, as shown, in which case the hatch 7 can be open or left closed as the storm approaches.

Figure 2:
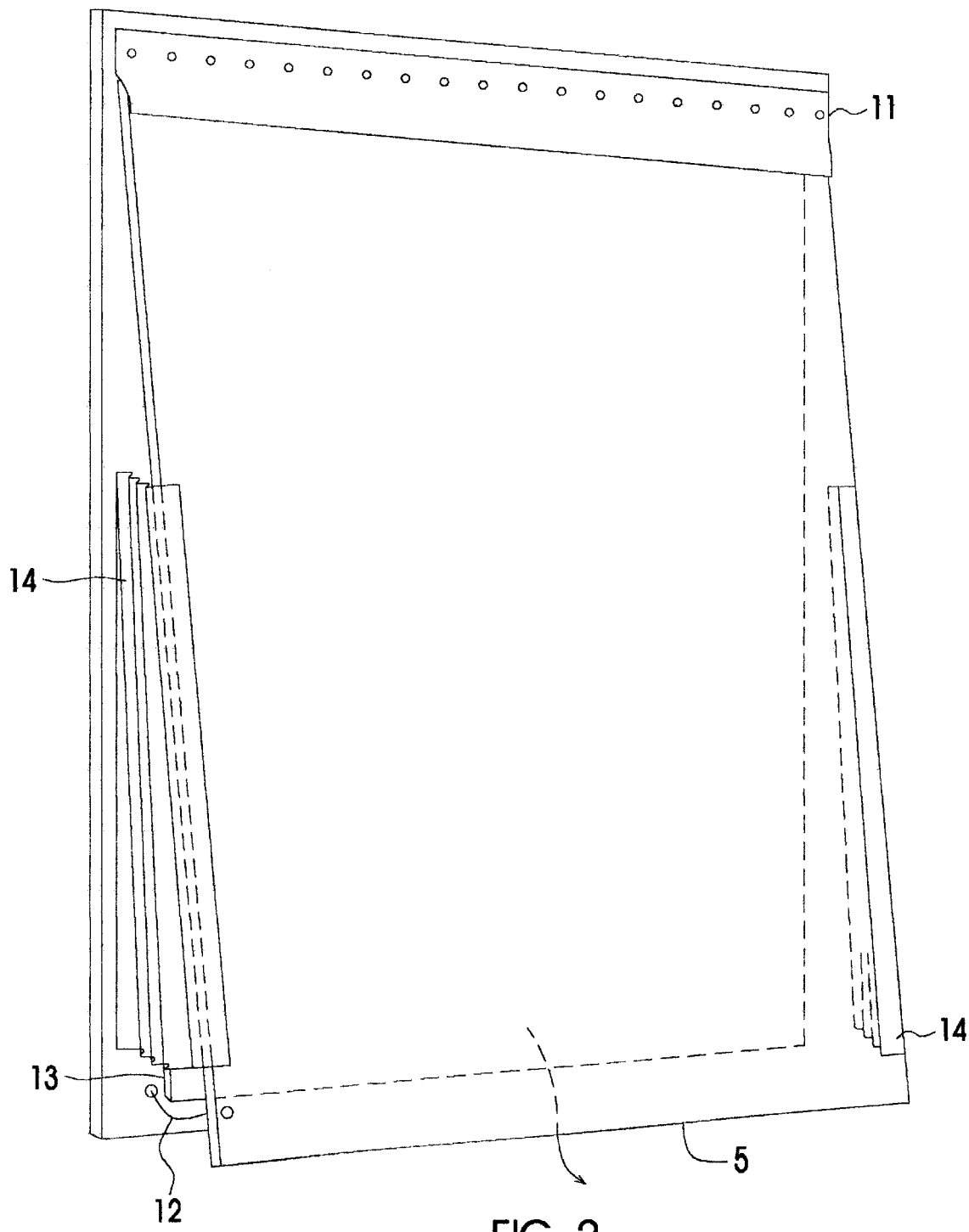
FIG. 2 is a perspective view of a hinged shutter that is itself a one-way valve.

In FIG. 2 a simple embodiment of the invention is to mount the shutter itself as a one-way valve over the outdoor side of a window opening, the shutter panel 5 (as in FIG. 1b) being strongly hinge-attached 11 across its top to the wall to hang down over and amply cover the window opening. The shutter panel is strongly but loosely tied to the sides and bottom of the opening 12 so that it can freely "blow" open, but only to a limited degree, allowing indoor air to flow to relatively low pressure leeward areas outdoors through the lee wall shutters (all windows behind the hinged shutters being opened). The shutter is shown in a leeward blown-open condition, with the arrow at the bottom indicating air escaping to the low pressure zone outside. At the same time, the high air pressure on the windward walls can cause little inward flow because the windward shutters quickly "blow" closed; thus the indoor air pressure must stay close to the lowest outdoor pressure bounding the shutters, regardless of wind direction or strength. According to the invention, adjuncts such as soft gaskets 13 might well be installed around the opening to ensure the blown-closed shutter valve is a sufficient barrier to air flow, and side flaps 14 might be necessary or desirable to prevent undue eddying and material-fatiguing flutter. (The side flaps 14 might well replace the ties 12, restraining the shutter from blowing too far open.)

Figure 3:
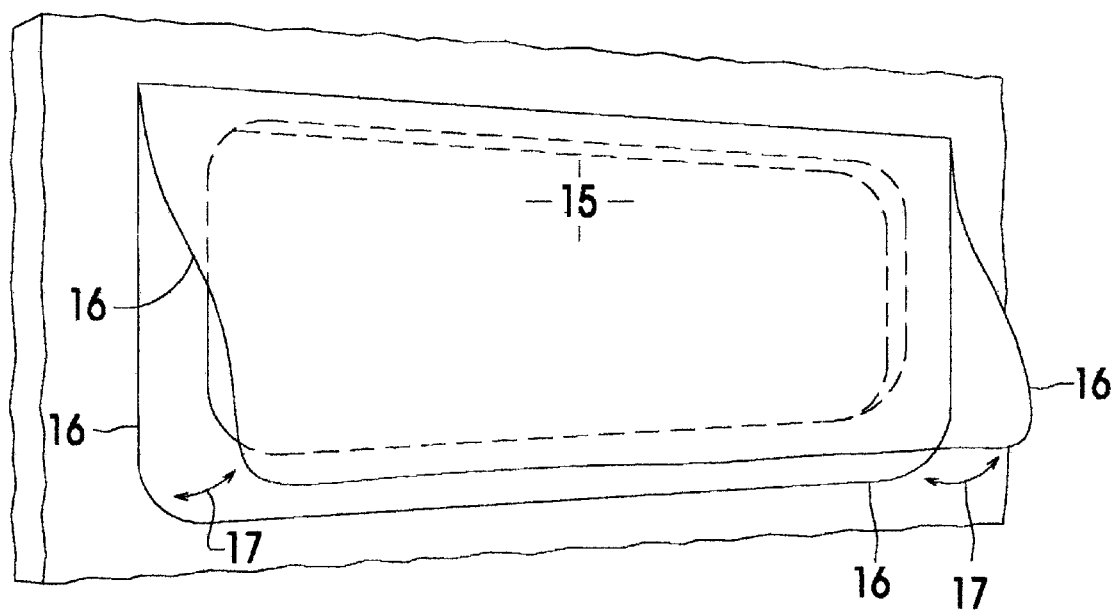
FIG. 3 is a perspective view of a portion of a shutter, viewed from outside to show a one-way valve in the respective closed and open positions.

FIG. 3 shows an alternative one-way valve arrangement, comprising a porthole 15 through a storm shutter and a "flap valve" 16 over the porthole, namely a lightweight, broad, flat hanging piece attached along its top edge to the shutter's outer surface just above the hole; said hanging piece 16 (hearinafter called the "flap") being positioned and dimensioned so that, in its undisturbed position hanging vertically downward from said hinged edge, it covers amply over and beyond the bounds of the porthole 15 and lies lightly against the shutter's outer surface surrounding that hole.

While there are rigid lightweight materials, according to the invention, that may suitably form the flap and, separately, a low-friction mechanical hinge along its top edge, there are advantages of simplicity, cost, storability and handling inherent in forming the flap and hinge in one piece using limp, "self hinging" polymeric film 16. This applies generally to the one-way valves herein.

The flap might well incorporate flexible ties or polymeric cord or ribbon 17 securing at least its lower corners to the shutter surface thereunder, the length of the ties limiting the degree to which the flap can be blown outward and so limiting flutter and consequent fatigue. (The arrows 17 serve to suggest both the opening of the flap as well as appropriate positions of said ties.)

Figure 4:
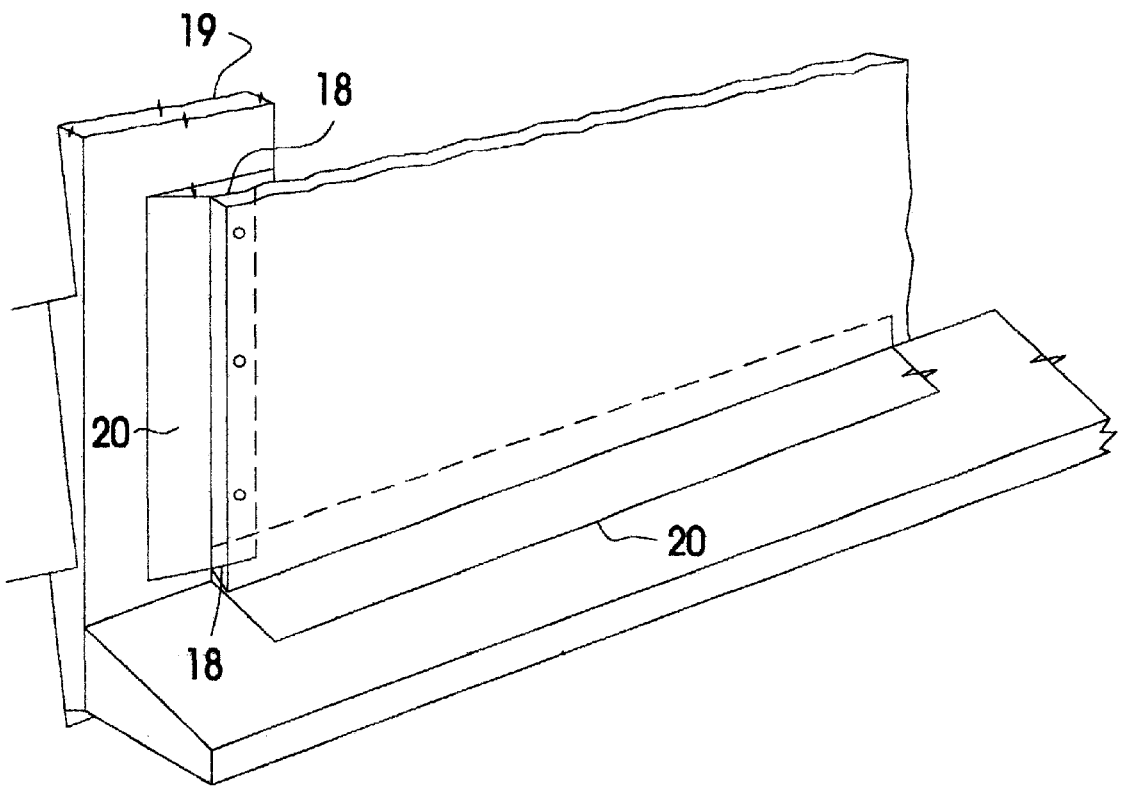
FIG. 4 is a perspective view of a portion of a rigid shutter with a perimeter type of a one-way valve.

In FIG. 4, alternatively, according to the invention, the "hole" of the one-way valve may be around the shutter rather than through it, taking the form of a fixed, narrow stand-off gap 18 between the shutter's inner surface and the wall's outer surface plane, normally the window trim 19, under much or all of the shutter's perimeter. The flap valve accordingly becomes a narrow strip 20 of flexible polymeric film or fabric (hereinafter called the "strip flap") secured along one edge to the shutter's inner surface around that stand-off portion of the shutter's perimeter, said strip flap extending from the shutter edge outward over window trim surface 19, and, in its undisturbed configuration, lying lightly in nominal contact with that surface. (Here, the term "window trim" is used to denote not only the side and top trim pieces around the window opening but also the sloped outer part of the window sill; or, denotes the latter and the wall surface itself in designs having no trim.) Being narrow, with little material to flutter, such strip flaps may not need restraining ties such as above, 17.

Figure 5A:
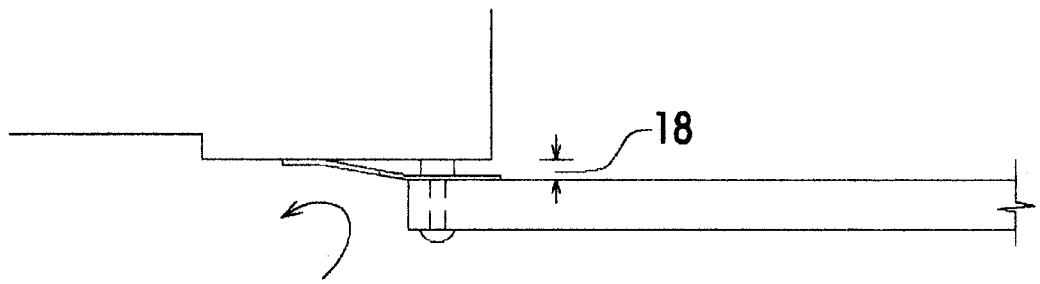
FIG. 5a is a cross-sectional view of the rigid shutter shown in FIG. 4, illustrating a closed position of the perimeter type of valve, with arrows suggesting air flow directions.
Figure 5B:
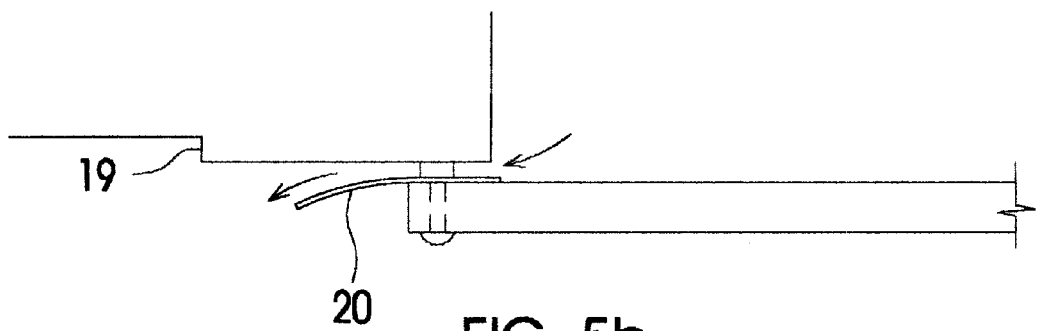
FIG. 5b is a cross-sectional of the rigid shutter shown in FIG. 4, illustrating an open position of the perimeter type of valve, with arrows suggesting air flow directions.

Even a slight air pressure differential acting inward closes the one-way valve, here illustrated in FIG. 5 as the strip flap type, 20, while a slight outward pressure differential opens it, shown in FIG. 5b. The arrows denote wind direction. (On the drawing, the space below the shutter cross-section is the outdoor side.)

Figure 6:
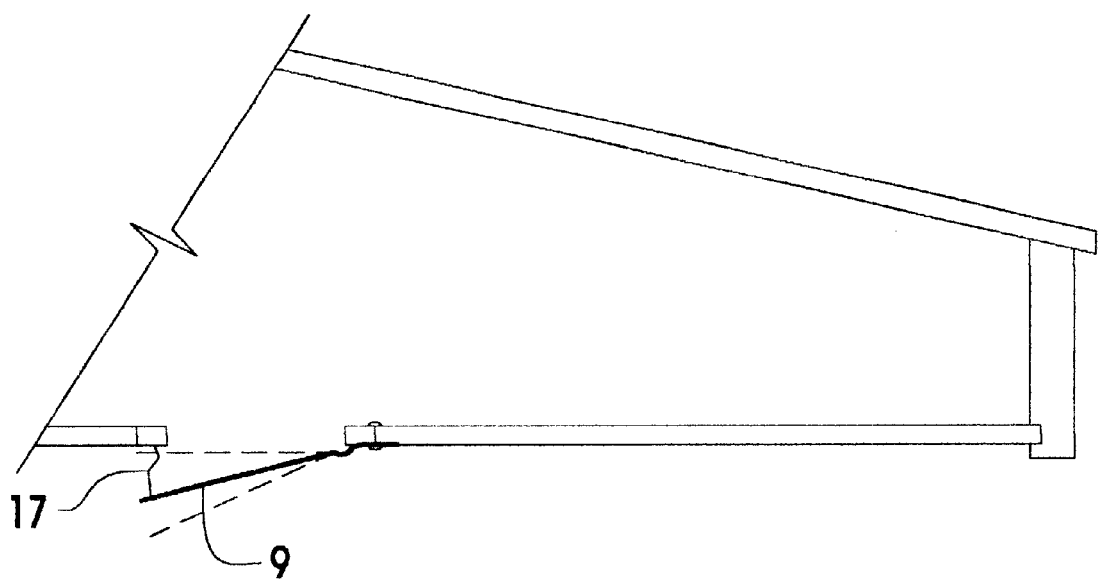
FIG. 6 is a cross-sectional view of a roof-space vent one-way valve.

FIG. 6 shows a simple one-way valve 9 placed over typical soffit vents that vent the roof space (as in FIG. 1c). This placement offers the advantage of low cost one-time installation, and the valve 9 can take the form of a continuous strip flap or a series of discrete valves depending upon the form of the existing vents. The flaps would normally hang open as shown to allow the vent openings to function normally through the seasons. Any significant wind would blow them closed if on the windward and more open if on the lee, essentially instantaneously (upper and lower dotted lines, respectively). The ties 17 may be required to limit the flap's opening and flutter especially in hurricane force winds "scouring" along the wall.

Figure 7:
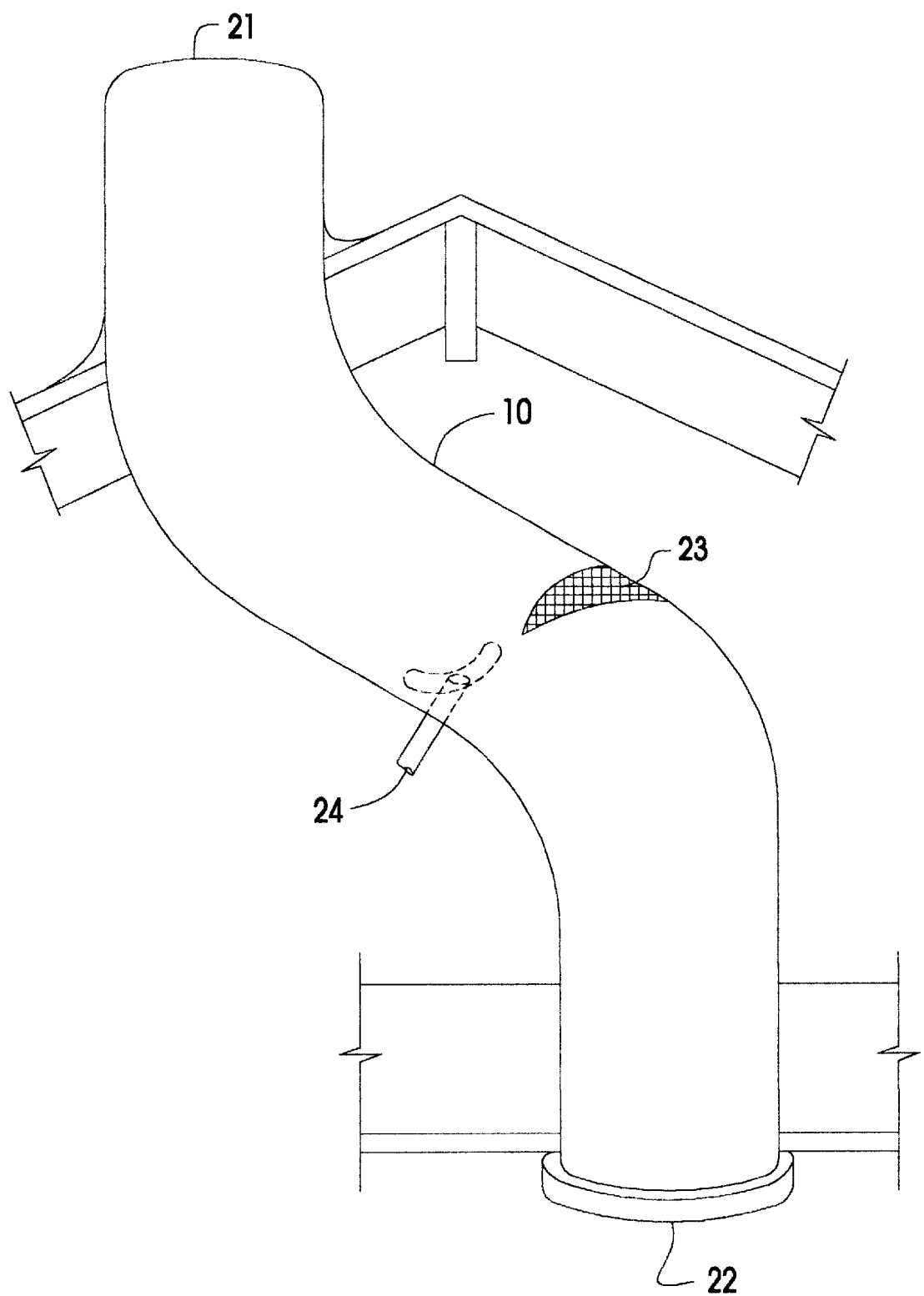
FIG. 7 is a schematical cross-sectional view of a Venturi-tube installed in a house and penetrating a roof and an uppermost ceiling of the house.

FIG. 7 schematically illustrates a further embodiment of the invention in which, rather than using one-way valves to depressurize indoor space, an amply-dimensioned Venturi-tube 10 is mounted vertically through or alongside the roof in such a manner that its open top 21 is subjected to winds blowing across it no matter what their direction, creating a Venturi-suction, and its body and lower openings "suck" air out of the building indoors 22 and, if desired, out of the roof space 23. In the latter case the roof vents would have to be closed off as a storm approached. As stated earlier, the tight shuttering of wall openings is a preparatory given in all cases. Rain water can be led away through a pipe or tube 24 to the house drain-waste-vent stack or directly outdoors. There are proprietary rain caps that might simplify the tube but apparently most of them moderate the Venturi-effect and some fail to withstand hurricane winds. The shape suggested in FIG. 7 can be manufactured readily in blow-molded thermoplastic, ultraviolet resistant; such material also removes the 'lightning rod' hazard and need for grounding that would be posed by a metal tube. Other design concerns are noted next.

In regard to the concerning design, the flap valve materials and details are readily designed so that even a slight pressure differential outward will cause indoor air to open the flap and flow out freely, while an inward pressure differential will quickly close the flap, preventing significant entry of outdoor air regardless of wind velocity. Further, the aggregate size of the valved opening (of the holes or stand-off gaps) must be made appreciably large relative to the leakiness of a given type of house construction, to ensure ample response of the valved openings to gusts to maintain low indoor pressure despite inward leakage through the windward envelope.

Fortunately, the nature of typical cracks and crack-like leaks through house envelopes serves to dampen their in-out flow response to gusts, compared to the ample responsiveness of the flap-valved openings. Hence it is feasible to derive the aggregate opening of the one-way valves in rule-of-thumb steps for houses and most small buildings; precise determination should not be required. The counter-pressure method may normally require that an aggregate area of one to two square feet of valve opening must be located in at least one lee zone created by wind blowing in any direction, in a modest house of typical size and construction. Those zones are identifiable, and that valve size requirement will not usually pose difficulty if operable windows or roof vents or both are used as the one-way valves. It can be seen that the Venturi-tube would have to be of similarly large cross-section area to ensure an adequate outward air flow capacity if used alone as the depressurizer. The tasks of mounting it securely against hurricane winds and flashing it durably against rains do raise questions of costs and practicality. Mounting it alongside the roof rather than through it might make it a more practical retrofit.

The user requirements for the window valve solution go beyond the usual need to mount shutters on all glazed openings of appreciable size before a storm hits. All operable windows behind one-way valves must be opened. That is in fact desirable in any case with conventional tight shuttering, to ensure that the shutter takes the wind loads and not the glass, but it's essential with the valved shutters if they are to do their crucial second job of helping to keep the roof on. Where a whole window has fixed glazing—no part operable—a conventional shutter is best used over it, applied tightly. Even so, the airleakiness of the glazing is likely less than that of the shutter, so that the glass may take much of the wind pressures. Further, the use of valved shutters on the other windows will increase the maximum inward loading on the fixed window, increasing the possibility of its glass "imploding" into the room—although preventing any outward breakage. The glazing of the fixed window should be taped for safety, or the shutter itself should be mounted especially tightly over such fixed windows, or both.

Changes and modifications to the embodiments of the invention described above may be made without departing from the spirit and scope of the invention which are intended to be limited only by the scope of the appended claims.

I claim:

1. A method for protecting roofs against windstorms comprising steps of:

providing a plurality of one-way venting valves over openings in a building envelope, respectively to ensure that at least one of the one-way venting valves is located on a lee side of the building envelope regardless of wind direction, the one-way venting valves closing under wind pressure to prevent inward air flow and being free to open to permit outward air flow when on the lee side;

closing openings in the building envelope not covered by the one-way venting valves during windstorms; and whereby indoor air flows freely out of the building envelope through the at least one of the one-way venting valves to a lee zone on the lee side to depressurize the inside of the building envelope to counteract an uplifting force on a roof of the building envelope induced by winds over the roof.

2. A method as claimed in claim 1 further comprising steps of:

equipping a plurality of window shutters over a plurality of operable windows of the building envelope, each window shutter functioning as the one-way venting valve permitting outward air flow only; and opening the windows behind the respective window shutters.

3. A method as claimed in claim 2 wherein at least one of the shutters comprises a panel mounted over an outdoor side of a window opening, the panel being hinged across a top thereof and strongly but loosely tied to sides or a bottom of the window opening so that the shutter is enabled to be blown open outwardly to a limited degree.

4. A method as claimed in claim 2 wherein at least one of the window shutters comprises a panel mounted over a window opening, the shutter defining a porthole therethrough and including a limp flap member attached to an outer surface of the shutter for selectively closing the porthole so that inward air flow through the porthole is inhibited while outward air flow is permitted.

5. A method as claimed in claim 2 wherein at least one of the shutters comprises a panel mounted over a window opening and spaced apart from the window opening to form a gap between an inner surface of the shutter and an outer surface of a wall surrounding the window opening, and strip flap members around a perimeter of the shutter for selectively closing the gap so that inward air flow through the gap is inhibited while outward air flow is permitted.

6. A method as claimed in claim 1 comprising a step of providing a plurality of one-way valves on roof vents which are located at opposed sides of the building envelope and in air communication with a roof space, to permit air flow from the roof space through one or more of the roof vents to a leeward area at the lee side of the building envelope while preventing air from flowing inwardly through the remainder of the roof vents into the roof space during windstorms.

7. A method as claimed in claim 1 further comprising steps of:

providing an opening through an uppermost ceiling; and maintaining the opening in an open condition during windstorms to ensure air communication of an indoor space under the ceiling with a roof space so that the indoor space under the ceiling and the roof space are both depressurized.

8. A method as claimed in claim 1 wherein the at least one or more one-way venting valves located on the lee side comprise an aggregate venting area of more than one square feet.

9. An apparatus for counterpressure roof protection against windstorms, comprising:

a window shutter panel adapted to be pivotally mounted over an outdoor side of a window opening of a house;

a seal material for providing a soft gasket around the window opening at the outdoor side thereof;

means for pivotally attaching one side of the window shutter panel to the outdoor side of the window opening;

a stop member including at least one flexible link member adapted to be connected strongly and loosely between the window shutter panel and the outdoor side of the window opening to limit an open position of the window shutter panel; and whereby the window shutter panel is free to open and permits outward air flow from an indoor area through the window opening to outdoors when the window shutter panel is located at a lee side of the house, and the window shutter panel and the gasket in combination prevent inward air flow from entering the window opening when the window shutter panel is under wind pressure and thereby pivots to close the window opening against the soft gasket, in order to depressurize the indoor area during windstorms for counteracting an uplift force on a roof of the house induced by windstorms.

10. An apparatus for counter pressure roof protection against windstorms, comprising:

a window shutter panel including a porthole therethrough, adapted to be mounted over an outdoor side of a window opening of a house; and at least one flexible flap member operably attached to an outer surface of the window shutter panel for selectively closing the porthole, thereby permitting outward air flow from an indoor space through the porthole of the window shutter panel to outdoors when the window shutter panel is located at a lee side of the house, and preventing inward air flow from entering the indoor space through the porthole of the window shutter panel when the window shutter panel is under wind pressure, whereby the indoor space is depressurized during windstorms to counteract an uplifting force on a roof of the house induced by windstorm.

11. An apparatus for counter-pressure roof protection against windstorms, comprising:

a window shutter panel adapted to be mounted over an outdoor side of a window opening of a house; and a plurality of strip flap members, attached around a perimeter of the window shutter panel for selectively closing a gap formed between an inner surface of the window shutter panel and the outdoor side of the window opening when the window shutter panel is mounted over the window opening and spaced apart from the window opening so that inward air flow through the gap is inhibited and outward air flow is permitted, thereby permitting outward air flow from an indoor space through or around the window shutter panel to outdoors when the window shutter panel is located at a lee side of the house, and preventing inward air flow from entering the indoor space through or around the window shutter panel when the window shutter panel is under wind pressure, whereby the indoor space is depressurized during windstorms to counteract an uplifting force on a roof of the house induced by windstorm.

* * * * *